(12) United States Patent
Herbert et al.

(10) Patent No.: US 9,221,556 B2
(45) Date of Patent: Dec. 29, 2015

(54) AIRPLANE OFF GROUND ADVISORY SYSTEM

(71) Applicant: The Boeing Company, Chicago, IL (US)

(72) Inventors: Keith B. Herbert, Hermosa Beach, CA (US); Sunil J. Jinadasa, Long Beach, CA (US)

(73) Assignee: The Boeing Company, Chicago, IL (US)

(*) Notice: Subject to any disclaimer, the term of this patent is extended or adjusted under 35 U.S.C. 154(b) by 122 days.

(21) Appl. No.: 14/065,846

(22) Filed: Oct. 29, 2013

(65) Prior Publication Data

US 2015/0120099 A1 Apr. 30, 2015

(51) Int. Cl.
*B64D 45/00* (2006.01)
*B64C 25/00* (2006.01)
*B64C 25/34* (2006.01)

(52) U.S. Cl.
CPC .......... *B64D 45/0005* (2013.01); *B64C 25/001* (2013.01); *B64C 25/34* (2013.01)

(58) Field of Classification Search
CPC ............... B64D 45/00; B64D 45/0005; B64D 2045/008; B64C 25/28
See application file for complete search history.

(56) References Cited

U.S. PATENT DOCUMENTS

| | | | |
|---|---|---|---|
| 3,584,503 A | 6/1971 | Senour | |
| 3,701,279 A | 10/1972 | Harris et al. | |
| 3,712,122 A * | 1/1973 | Harris et al. | 340/945 |
| 4,019,702 A * | 4/1977 | Annin | 244/182 |
| 4,034,334 A | 7/1977 | Allyn | |
| 4,312,042 A | 1/1982 | Bateman | |
| 4,507,742 A | 3/1985 | Bateman | |
| 6,128,951 A | 10/2000 | Nance | |
| 6,499,005 B2 | 12/2002 | Gunderson et al. | |
| 6,854,689 B1 | 2/2005 | Lindahl et al. | |
| 7,093,795 B2 | 8/2006 | Lindahl et al. | |
| 7,193,530 B2 * | 3/2007 | Nance | 340/960 |
| 7,274,310 B1 | 9/2007 | Nance | |
| 7,475,849 B2 | 1/2009 | Lindahl et al. | |
| 7,944,372 B2 * | 5/2011 | Gouette et al. | 340/960 |
| 2003/0015622 A1 | 1/2003 | Rogers | |
| 2003/0033927 A1 * | 2/2003 | Bryant et al. | 91/471 |
| 2008/0119967 A1 | 5/2008 | Long et al. | |
| 2009/0105874 A1 | 4/2009 | Tietjen et al. | |
| 2009/0207047 A1 * | 8/2009 | Ross, III | 340/960 |
| 2011/0303788 A1 | 12/2011 | Gago | |

FOREIGN PATENT DOCUMENTS

| | | |
|---|---|---|
| CN | 101349606 A | 1/2009 |
| DE | 20206677 U1 | 7/2002 |
| EP | 2557542 A2 | 2/2013 |
| GB | 2489058 A | 9/2012 |

* cited by examiner

*Primary Examiner* — Nicholas Kiswanto
(74) *Attorney, Agent, or Firm* — Felix L. Fischer (57) ABSTRACT

An airplane off ground advisory system employs at least one position sensor attached for detection of an extended condition and a compressed condition of a main landing gear. A control system receives an input from the position sensor. The control system records a toggling of the input from an extended to a compressed to an extended condition and providing an output. At least one indicator is coupled to the control system to be activated by the output.

19 Claims, 7 Drawing Sheets

AIRPLANE OFF GROUND ADVISORY SYSTEM

BACKGROUND INFORMATION

1. Field

Embodiments of the disclosure relate generally to the field of aircraft flight instrumentation and more particularly to a system for notifying pilots of an off ground flight condition resulting from a landing bounce which incorporates landing gear extension/compression measurement and pilot indicators.

2. Background

Aircraft operating in high winds or other adverse environmental conditions during landing or landing with improperly serviced landing gear shock struts may encounter the runway surface with sufficient force to induce a bounce (rebound off the runway) causing the aircraft to again become airborne. Premature rapid de-rotation (pitching the nose down) without the main landing gear firmly planted on the runway has been cited as one of the contributing elements for aircraft undesired landing incidents. Due to the size and cockpit positioning in large commercial aircraft, if an airplane bounces off the runway after touchdown, the flight crew may not recognize that the airplane has bounced due to the difference between the cockpit movement and the airplane main landing gear position relative to the ground; i.e. the cockpit may be moving up or down while the main gear are coming off the ground. If the airplane derotation is performed while the main gear are off the ground, it could lead to a nose landing gear only landing that could cause significant structural damage to the airplane.

It is therefore desirable to provide an Airplane Off Ground Advisory System (AOGAS) which will provide an indication to the flight crew positively identifying the aircraft has bounced after initial contact with the runway so that the crew can take appropriate action to make a safe landing or perform a go-around operation.

SUMMARY

Embodiments disclosed herein provide an airplane off ground advisory system employing at least one position sensor attached for detection of an extended condition and a compressed condition of a main landing gear. A control system receives an input from the position sensor. The control system records a toggling of the input from an extended to a compressed to an extended condition and provides an output. At least one indicator is coupled to the control system to be activated by the output.

The described embodiments provide a method for advising a flight crew of an aircraft off ground condition by sensing compressed main landing gear struts and deenergizing a control relay. Upon sensing extended main landing gear struts the control relay is energized which energizes a timer relay and enabling activation of an indicator.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a system employing compression and extension sensors on the main landing gear with a control circuit to deliver a visual queue to both the captain and first officer that a bounce has occurred and enables the flight crew to take appropriate action to complete the landing sequence or to perform a go-around maneuver. The system components are uniquely integrated, to detect and advise the flight crew when the airplane has touched down on the runway and subsequently rebounded into the air. The system control circuit provides the indication for a finite (adjustable) period of time only after the left, or right, or both main landing gear struts (piston/cylinder assemblies) has been detected to compress sufficiently to ensure the airplane has made contact with the runway followed by a fully extended position of both struts. The system utilizes two strut position sensors, and the control circuit includes two control relays, a timer relay, and the visual cue has two cockpit indicator lights. This system provides a positive indication in the cockpit that the airplane has bounced off the runway not rely on the perception or judgment of the pilots alone.

Figure 1:
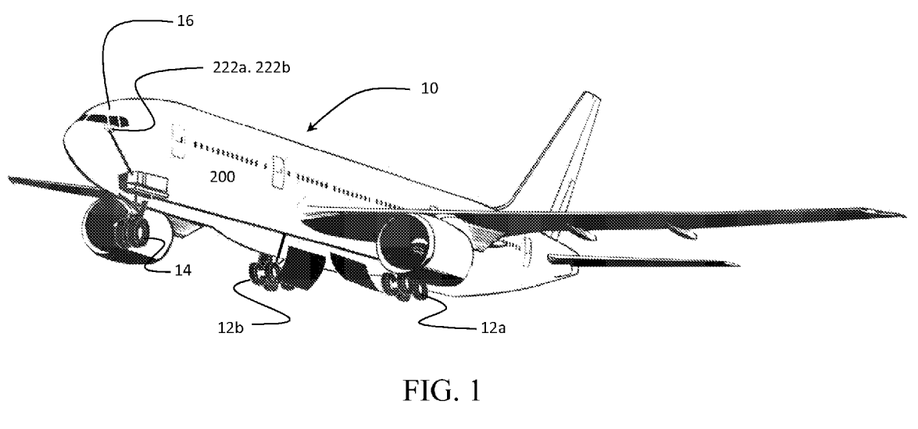
FIG. 1 is a pictorial view of an example aircraft on which the present embodiments may be employed.

As shown in FIG. 1, a large commercial aircraft 10 typically employs main landing gear 12*a* and 12*b* and a nose landing gear 14. The main landing gear shown for the present embodiment are single truck arrangements each having four wheels (as will be described in greater detail subsequently) mounted from the wings but fuselage mounted mains may be employed in alternative configurations and multiple trucks with varying numbers of wheels and tires may be employed. The cockpit 16 is present at the forward extent of the fuselage which may result in misperception of motion as the airplane bounces off the runway after touchdown. The flight crew may not recognize that the airplane has bounced due to the difference between the cockpit movement and the airplane main landing gear position relative to the ground. The cockpit may be moving up or down while the main gear are coming off the ground.

Figure 2:
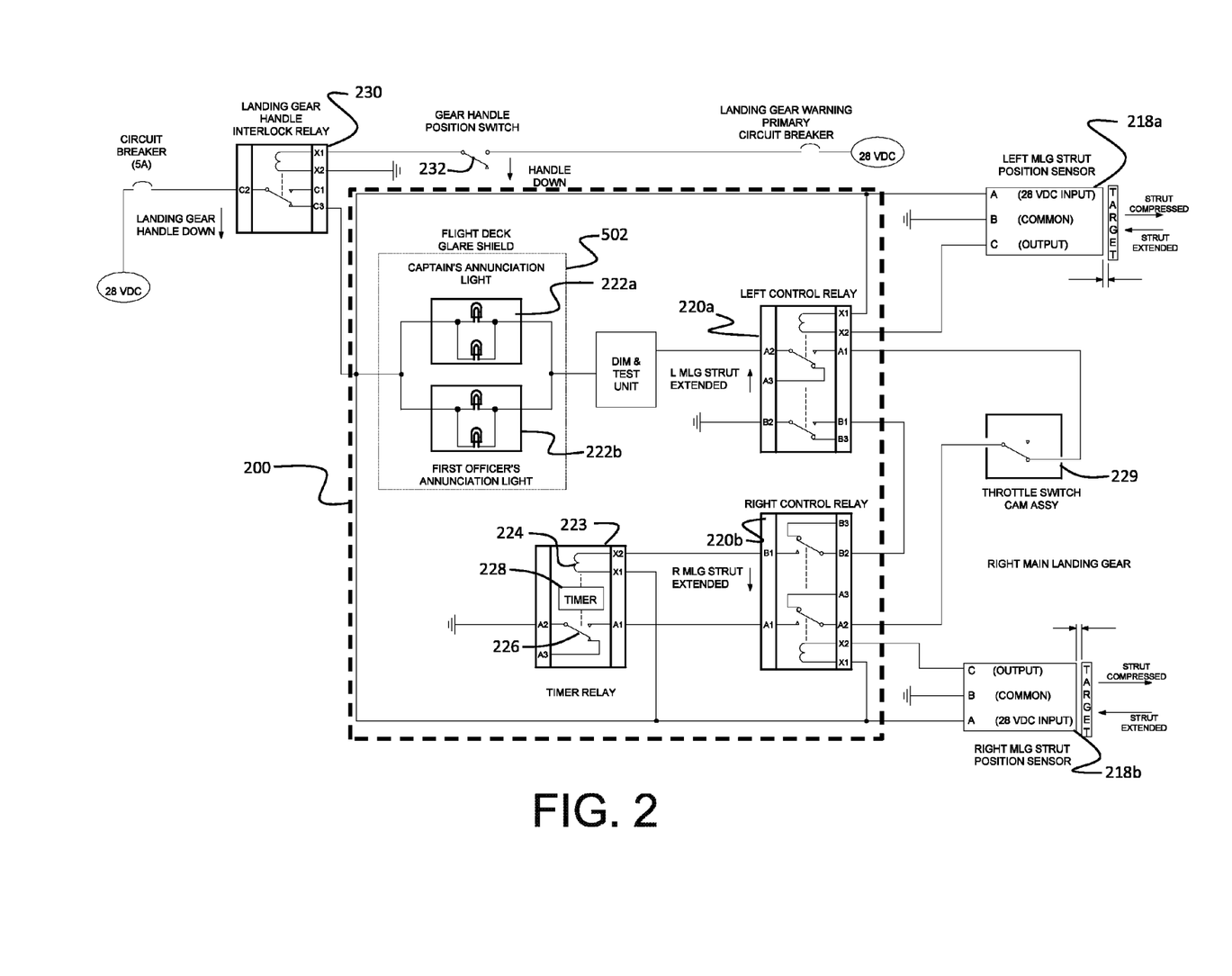
FIG. 2 is a schematic diagram of the elements of an embodiment of the AOGAS.
Figure 3:
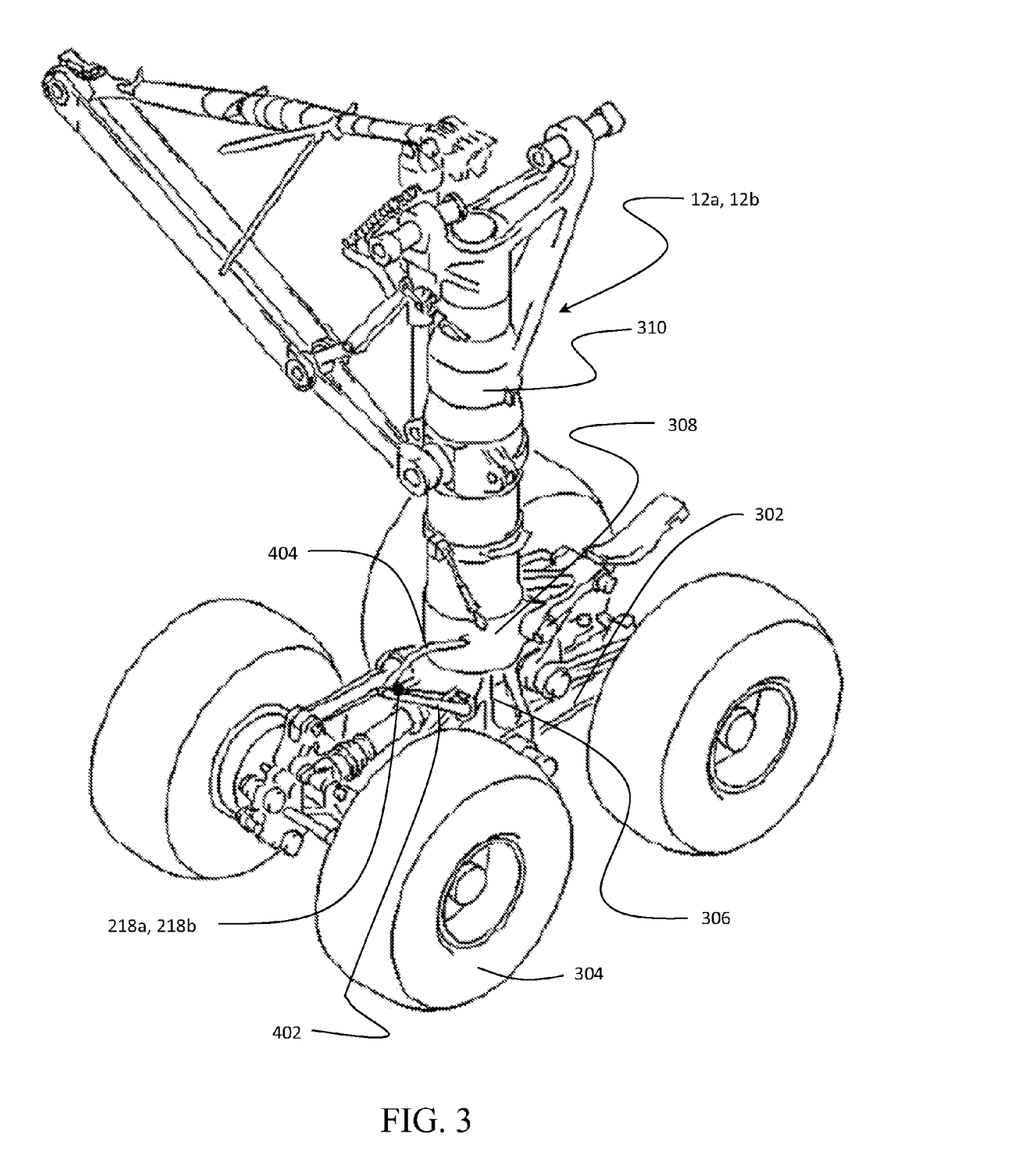
FIG. 3 is a pictorial view of an example main landing gear on which an AOGAS sensor may be employed.

An embodiment of the Aircraft Off Ground Advisory System (AOGAS) is shown in FIG. 2. A position sensor 218*a* is mounted on the left landing gear 12*a* and a position sensor 218*b* is mounted on the right main landing gear 12*b*. The position sensors provide an input to a control system which, in turn, provides an output to an indicator system as will be described in greater detail subsequently. As shown in FIG. 3, each main landing gear 12*a*, 12*b* employs a truck 302 with four wheels 304. The truck is mounted to a piston 306 which is received in a cylinder 308 in the strut 310. Each position sensor 218*a*, 218*b* monitors the relative position of the landing gear piston 306 to the cylinder 308 (strut position) as will be described in greater detail subsequently. When the landing gear is not supporting any portion of the airplane weight, the landing gear piston 306 is fully extended out of the cylinder 308. The landing gear are in this position when the airplane is airborne regardless if the landing gear is retracted (raised) or deployed (lowered). The piston 306 is only capable of moving relative to the cylinder 308 when enough of the airplane weight has been exerted on that that landing gear to overcome the internal pressure inside the cylinder 308. Piston movement indicates positive weight on wheels and contact with the runway.

Figure 4A:
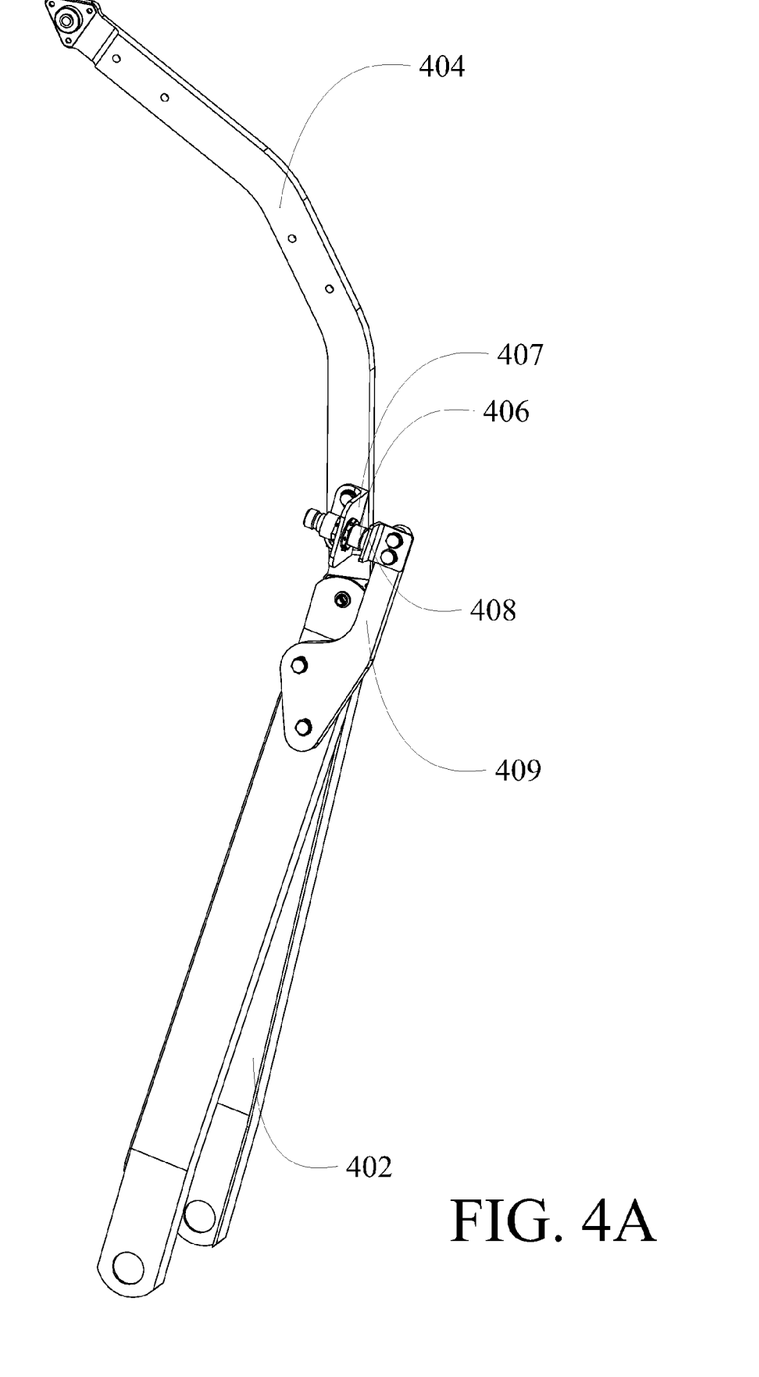
FIG. 4A is a detailed view of a main landing gear actuation strut assembly from FIG. 3 showing implementation of the sensor with the actuation strut assembly in the extended position.
Figure 4B:
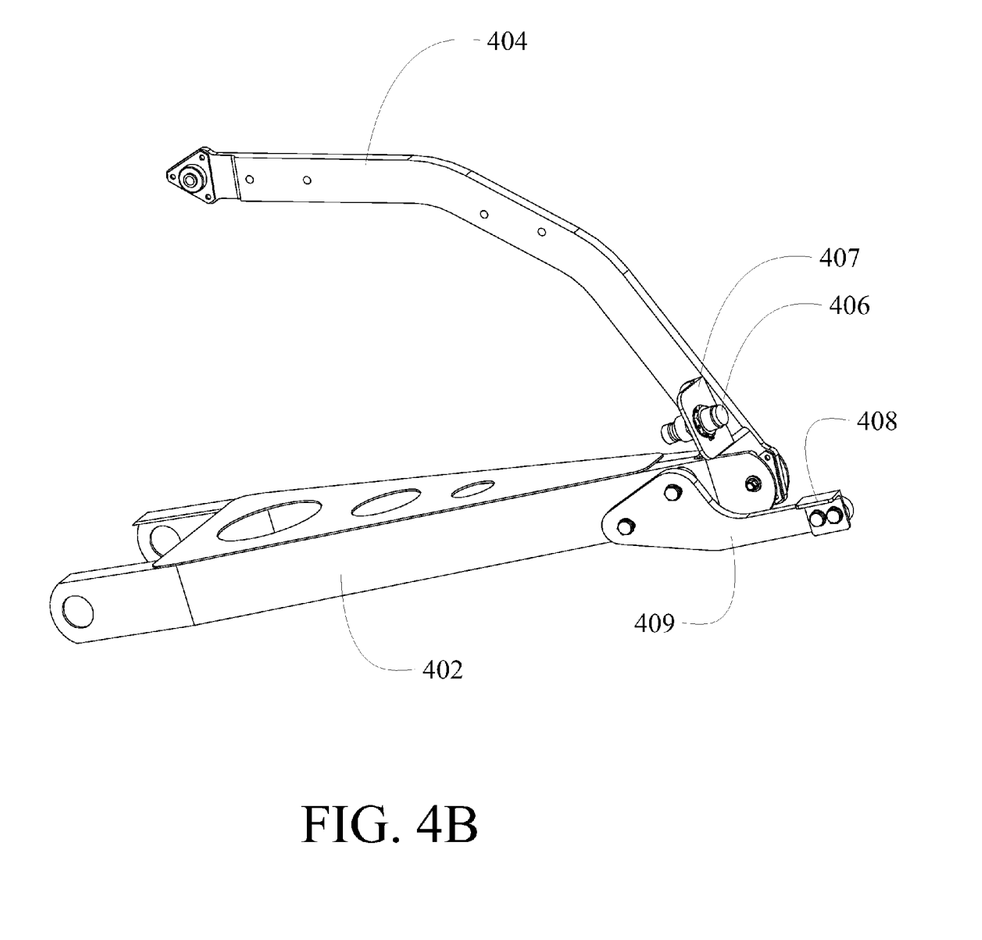
FIG. 4B is a detailed view of the actuation strut assembly in the compressed position.

An example position sensor 218a, 218b and associated structural features for operation is shown in FIGS. 4A and 4B. A first link arm 402 attached to the piston 306 of the main landing gear assembly 12a, 12b is pivotally attached to a second link arm 404 which is attached (directly or through additional link assemblies) to the cylinder 308. A proximity switch 406 (or contact switch), is attached by a bracket 407 to the second link arm 404, and is positioned to engage a proximity target 408 extending from the first link arm 402 on a bracket 409. If piston 306 is extended in the cylinder 308 as previously described for an off ground condition, pivoting of the second link arm 404 relative to the first link arm 402 as shown in FIG. 4A engages switch 406 with the target 408 and switch 406 provides the extended signal for position sensor 218a, 218b. If the landing gear is on ground and the piston 306 is compressed in cylinder 308, the relative position of second link arm 404 to first link arm 402 disengages switch 406 from the target 408, as seen in FIG. 4B and switch 406 provides a compressed signal for position sensor 218a, 218b.

Figure 5:
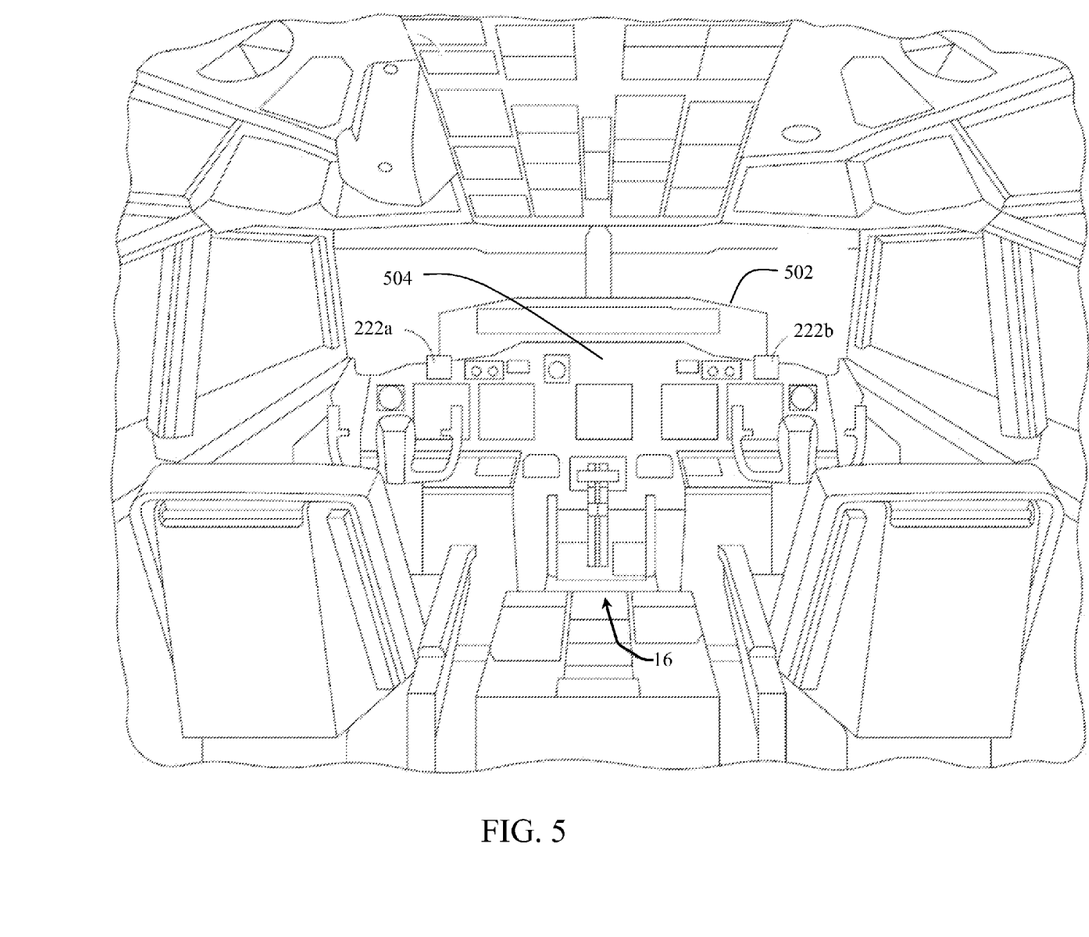
FIG. 5 is a pictorial view of an example aircraft cockpit in which the cockpit indicator of the embodiment of FIG. 2 may be employed; and, FIG. 6 is a flow chart of a method for implementing aircraft off ground advisory using the embodiments described herein.
Figure 6:
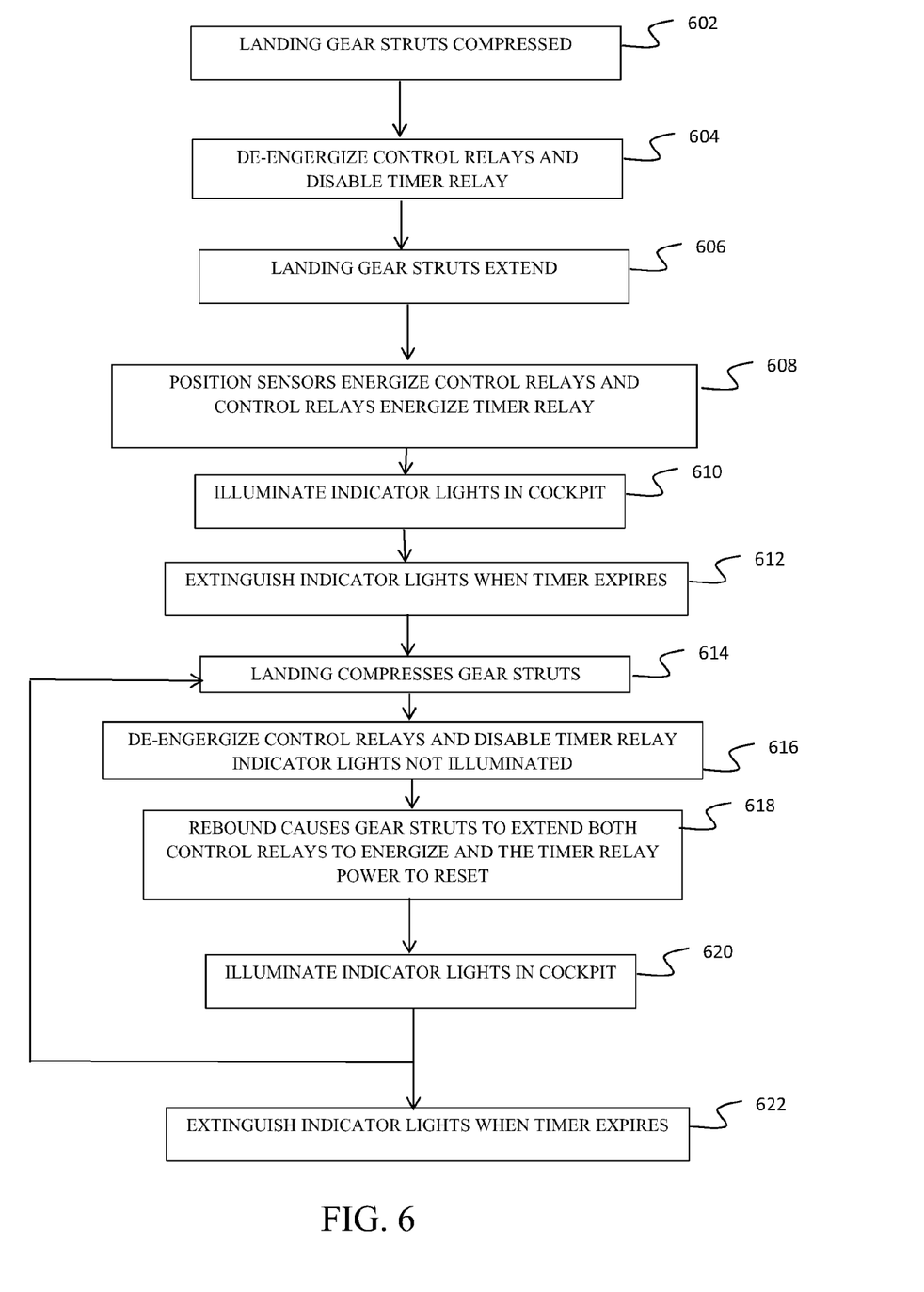

Returning to FIG. 2, the output from each position sensor 218a, 218b is used to energize and de-energize the two control relays 220a and 220b in control system 200. Control relays 220a and 220b are dual contact in the example embodiment and at least one control relay is employed in alternative embodiments. The function of the control relays 220a and 220b is twofold; first to provide an electrical path to enable illumination of cockpit indicator lights 222a and 222b, as will be described in greater detail subsequently, and the second is to provide a power interrupt to reset the time delay relay. Output from the position sensor 218a installed on the left-hand landing gear controls the operation of control relay 220a while output from the right-hand side position sensor 218b controls the control relay 220b. Each control relay, 220a, 220b will energize when the corresponding strut extends fully providing continuity between pin B and pin C in the corresponding position sensor 218a, 218b. The control relays 220a and 220b de-energize with detection of strut compression causing no continuity between pin B and pin C in the position sensors 218a and 218b. When control relay 220a or control relay 220b is energized, continuity exists between control relay contact pins A1 and A2 and between pins B1 and B2. When the control relay is de-energized, electrical continuity is established between pins A2 and A3 and between pins B2 and B3. A timer relay 223 is included to limit the duration of the indicator lights 222a and 222b that will illuminate in the flight deck. Timer relay 223 pin set "A1, A2, A3" is installed in series with the indicator lights. The timer relay energizing coil 224 is controlled by, and is in series with, the pin set B1, B2, B3 of both control relays. The timer relay 223 operates in the following manner. Power must be present on pin X1 and ground on pin X2 to energize. The timer relay 223 contacts 226 are open (continuity between pins A2 and A3) when the timer is unpowered. Timer relay 223 contacts 226 close when power and ground are applied to pins X1 and X2 respectively providing continuity between pins A1 and A2 for a finite period of time defined by timer 228 and then open. Timer relay contacts open after the predetermined time period even when both power and ground remain on pins X1 and X2 respectively. The time duration of continuity between pins A1 and A2 provided by timer 228 is customizable. The timer resets when power to the timer resets The system 200 features two indicator lights 222a and 222b, each mounted within general line of sight of the captain and first officer. As shown in FIG. 5 for an example embodiment, the indicator lights 222a and 222b may be mounted to the glare shield 502 over the instrument panel 504 in the cockpit. As shown in FIG. 2, the indicator lights 222a and 222b are wired together to illuminate and extinguish together providing the same indication to both flight crew members. While described for the embodiment herein as indicator lights, the indictor for the off ground condition presented to the pilots may be aural using a sound enunciator system. The overall system functions in the following manner as shown in FIG. 6.

When the airplane is on the ground, the landing gear struts are compressed and the impedance at pin C is high in both position sensors 218a and 218b, step 602. As such, both control relays 220a and 220b are de-energized and power to the timer relay 223 is disabled, step 604, and electrical continuity is not established to the indicator lights 222a and 222b inhibiting illumination.

When the airplane becomes airborne (Weight-Off-Wheels) at takeoff following the takeoff run, both landing gear struts extend fully when the airplane weight is no longer bearing on the landing gear, step 606. The strut position sensors 218a and 218b energize their respective control relay 220a and 220b and the control relays energize the timer relay 223, step 608. In this state electrical continuity is established through both control relays and the timer relay contacts enabling the indicator lights 222a and 222b in the cockpit to illuminate, step 610. The indicator lights 222a and 222b will remain illuminated until the timer 228 expires when the timer relay 223 contacts 226 open causing the indicator lights to extinguish, step 612.

When the airplane is climbing, during cruise, and descent following the takeoff sequence the system will not change state until power is reset to the timer relay 223. Power can only be reset when either the right or left landing gear strut compresses sufficiently to be detected by the respective position sensor 218a or 218b and then extends fully. Since the gas pressure inside the two landing gear cylinders 308 holds the piston 306 rigidly extended from the cylinder precluding actuation of the position sensors 218a, 281b. Without the power reset, the indicator lights 222a, 222b will not illuminate during any of these flight phases. During landing, step 614, if the airplane remains in contact with the runway following initial touchdown, the airplane touches down and settles onto the runway with both the right and left landing gear simultaneously reverting to the fully compressed position (on-ground state) which will cause the strut position sensors 218a, 218b to deenergize both control relays 220a, 220b and the timer relay 223, step 616. An open circuit to the indicator lights 222a, 222b will remain in effect and the indicator lights will not illuminate.

If the airplane touches down and rebounds into the air following initial touchdown, a rebound is determined to have occurred when at least one of the main landing gear struts has been detected to compress followed by both main landing gear struts detected to be fully extended. During this event sequence the strut position sensors 218a, 218b will toggle, extended—compressed—extended, causing both control relays 220a, 220b to energize and the timer relay 223 power to reset, step 618. In that the airplane has regained an airborne state, continuity through all the control relays 220a, 220b and the timer relay 223 will be established and the indicator lights 222a, 222b will illuminate, step 620. The indicator lights 222a, 222b will remain illuminated until timer 228 expiration (as would be the case if the flight crew performed a go-around maneuver), step 622, or the airplane regains contact with the runway, step 624, the system reverts to step 614. In the event the airplane rebounds a second time (airplane regains on ground state followed by an airborne state), power to the timer relay 223 will reset and re-illuminate the indicator lights while the airplane is off-ground. The system is not limited to the number of rebound events since power to the timer relay 223 resets following every air-ground-air sequence.

Returning to FIG. 2, an optional takeoff inhibit feature is available to prevent the indicator lights 222a and 222b from illuminating following airplane rotation during takeoff. The takeoff inhibit feature employs a throttle position switch 229, activated at a predetermined advanced throttle position, in conjunction with a landing gear handle position interlock relay 230 interrupting power to the control relays 220a, 220b in the system, step 626. Without the throttle position switch 229 the indicator lights 222a and 222b will illuminate following takeoff rotation providing the cockpit crew a visual cue the system is functioning normally. If the takeoff inhibit function using the throttle position switch 229 is employed, the visual cue would only be initiated when the landing gear handle is lowered prior to landing as indicated by gear handle position switch 232, step 628. In the up position of the landing gear handle, the landing gear handle interlock relay 230 is deactivated and no power is provided to the system 200. The indicator lights 222a and 222b will illuminate when the gear handle is selected down by the flight crew and will illuminate until the timer relay 223 expires. All other features of the system would remain the same.

The inhibit feature may also be accomplished by integrating throttle position into the indicating circuit. Switch stacks in the throttle control module are used to monitor throttle position. By utilizing one of the switches in one of the stacks, an open circuit condition to the indicator lights can be accomplished when the throttles are advance beyond a predetermined position as they are during takeoff.

The timer relay 223 has customizable features in the example embodiment. Minimizing or eliminating short duration annunciations or light flicker due to landing skip or minor bounces may be accomplished with the timer relay including a time delay on actuation. Additionally, the timer relay 223 actuation period (the total time the contacts are actuated after the relay coil has been energized) may be adjusted as needed to reflect the anticipated maximum event time. The baseline timer relay has no initial delay and nominal timer duration of ten (10) seconds.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An airplane off ground advisory system, comprising:
    at least one position sensor attached for detection of an extended condition and a compressed condition of a main landing gear during landing;
    a control system receiving an input from the at least one position sensor, said control system recording a toggling of the input from an extended to a compressed to an extended condition and providing an output based on said toggling; and,
    at least one indicator coupled to the control system activated by the output.

2. The airplane off ground advisory system as defined in claim 1 wherein the control system further comprises at least one control relay receiving the input from the at least one position sensor, said control relay energized by an extended condition of the main landing gear.

3. The airplane off ground advisory system as defined in claim 2 wherein the control system further comprises a timer connected to the relay, said timer activated when the control relay is energized, said timer resetting the control system output to deactivate the at least one indicator upon expiration of a predetermined time.

4. The airplane off ground advisory system as defined in claim 3 wherein the at least one position sensor comprises a first position sensor mounted on a first main landing gear and a second position sensor mounted on a second main landing gear, said first position sensor and second position sensor each providing an input to the control system.

5. The airplane off ground advisory system as defined in claim 4 wherein the at least one control relay comprises a first control relay receiving the input from the first position sensor and a second control relay receiving the input from the second position sensor, said first control relay energized by an extended condition of the first main landing gear and said second control relay energized by an extended condition of the second main landing gear.

6. The airplane off ground advisory system as defined in claim 1 wherein the at least one indicator comprises a first indicator light within view of a first pilot and a second indicator light in view of a second pilot, said first and second indicator lights activated simultaneously by the control system output.

7. The airplane off ground advisory system as defined in claim 2 wherein the control system further comprises a takeoff inhibit feature.

8. The airplane off ground advisory system as defined in claim 7 wherein the takeoff inhibit feature comprises a throttle position switch, said throttle position switch detecting a predetermined advanced position of the throttle and providing an open circuit responsive to the predetermined advanced position.

9. The airplane off ground advisory system as defined in claim 8 wherein the throttle position switch interrupts output from the at least one control relay.

10. The airplane off ground advisory system as defined in claim 8 wherein the takeoff inhibit feature further includes a landing gear handle interlock relay, said landing gear handle interlock relay providing power to the control system responsive to a down position of a landing gear handle.

11. A method for advising a flight crew of an aircraft off ground condition during landing, comprising:
    sensing compressed main landing gear struts;
    deenergizing a control relay based on sensing compressed main landing gear struts;
    sensing extended main landing gear struts; and,
    energizing the control relay based on sensing extended main landing gear struts, said control relay energizing a timer relay and enabling activation of an indicator.

12. The method as defined in claim 11 further comprising deenergizing the control relay upon expiration of a timer in the timer relay and disabling the indicator.

13. The method as defined in claim 12 further comprising sensing compressed main landing gear struts upon landing and deenergizing the control relay.

14. The method as defined in claim 13 further comprising sensing extended main landing gear struts upon a rebound and energizing the control relay and timer relay.

15. The method as defined in claim 14 further comprising;
sensing throttle position, and
deactivating power to control relay upon a predetermined advanced throttle position being sensed.

16. The method as defined in claim 15 further comprising:
sensing a down position of a landing gear handle and
activating power to the control relay responsive to the down position.

17. The method as defined in claim 16 further comprising activating the timer relay and indicator upon activating of power to the control relay.

18. The method as defined in claim 11 further comprising selecting a time delay for the timer in timer relay.

19. The method as defined in claim 11 further comprising delaying activation of the timer relay for a predetermined time.

* * * * *